United States Patent [19]

Frandsen

[11] 4,331,990
[45] May 25, 1982

[54] FLAT COIL LINEAR ACTUATOR FOR MULTIPLE TRANSDUCER ARMS

[75] Inventor: Jorgen Frandsen, Winnipeg, Canada

[73] Assignee: Burroughs Corporation, Detroit, Mich.

[21] Appl. No.: 106,847

[22] Filed: Dec. 26, 1979

Related U.S. Application Data

[62] Division of Ser. No. 85,945, Oct. 18, 1979, abandoned.

[51] Int. Cl.³ .......................... G11B 5/54; G11B 21/08
[52] U.S. Cl. ...................................... 360/106; 310/13; 360/78; 360/97
[58] Field of Search ............. 360/106, 105, 109, 97–99, 360/77–78; 310/13; 179/100.3 V; 365/215; 318/561, 653, 548

[56] References Cited

U.S. PATENT DOCUMENTS

| | | | |
|---|---|---|---|
| 3,314,057 | 4/1967 | Mogtader | 360/106 |
| 3,735,163 | 5/1973 | Dijkstra | 360/106 |
| 3,914,791 | 10/1975 | Stebe | 360/97 |
| 4,132,910 | 1/1979 | Kiss et al. | 310/13 |
| 4,138,741 | 2/1979 | Hedlund | 179/100.3 V |
| 4,196,456 | 4/1980 | Manzke et al. | 360/106 |

FOREIGN PATENT DOCUMENTS

2315141  1/1977  France .............................. 360/109

*Primary Examiner*—Alfred H. Eddleman
*Attorney, Agent, or Firm*—John J. McCormack; Nathan Cass; Kevin R. Peterson

[57] ABSTRACT

An improved disk file is disclosed including a number of like transducer/actuator arrays disposed about a common disk (stack) and adapted, on the one hand, to allocate track coverage while, on the other hand, also providing (optional) a "back up" track coverage capability—whereby each actuator array is assigned a different track set (set of adjacent tracks in the file) as its "primary responsibility", also being assigned a back-up coverage responsibility over another adjacent track set as its "secondary" responsibility—this overall arrangement resulting in such benefits as "multiple paths to data".

14 Claims, 38 Drawing Figures

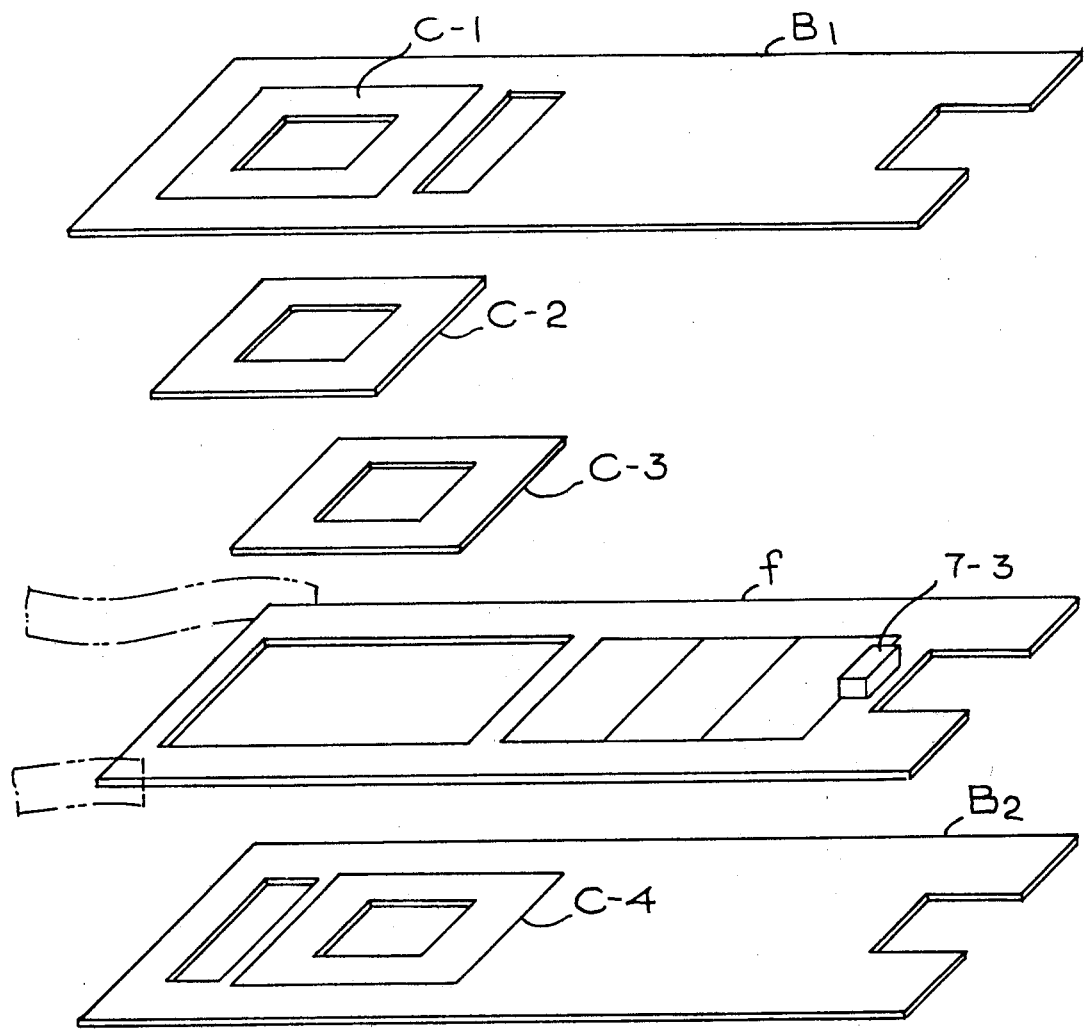
Fig. 9-A

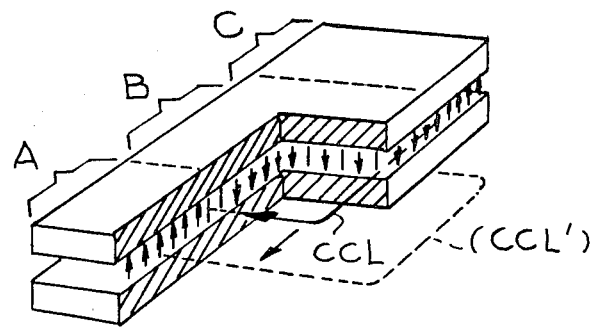
Fig. 13
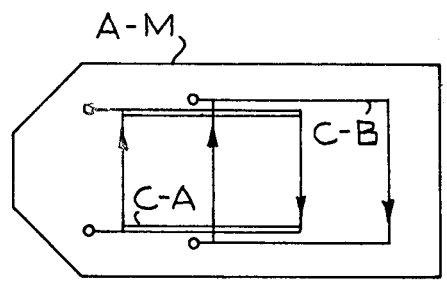
Fig. 14
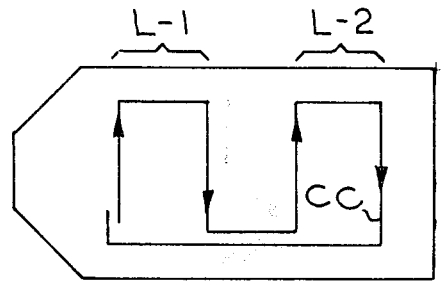
Fig. 15
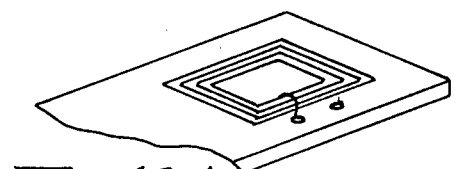
Fig. 16-A
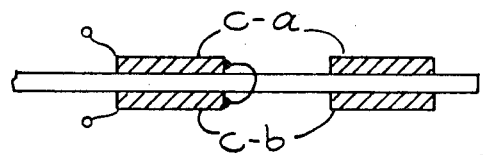
Fig. 16-A'
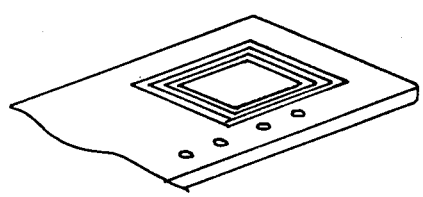
Fig. 16-B
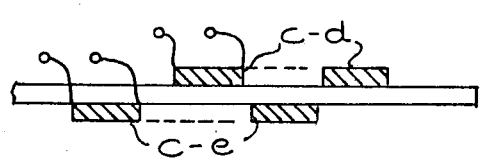
Fig. 16-B'
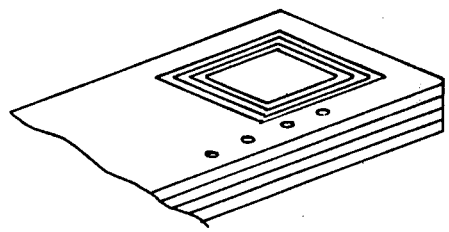
Fig. 16-C
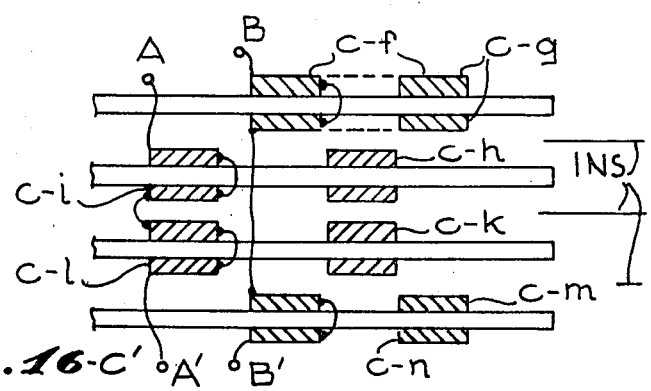
Fig. 16-C'

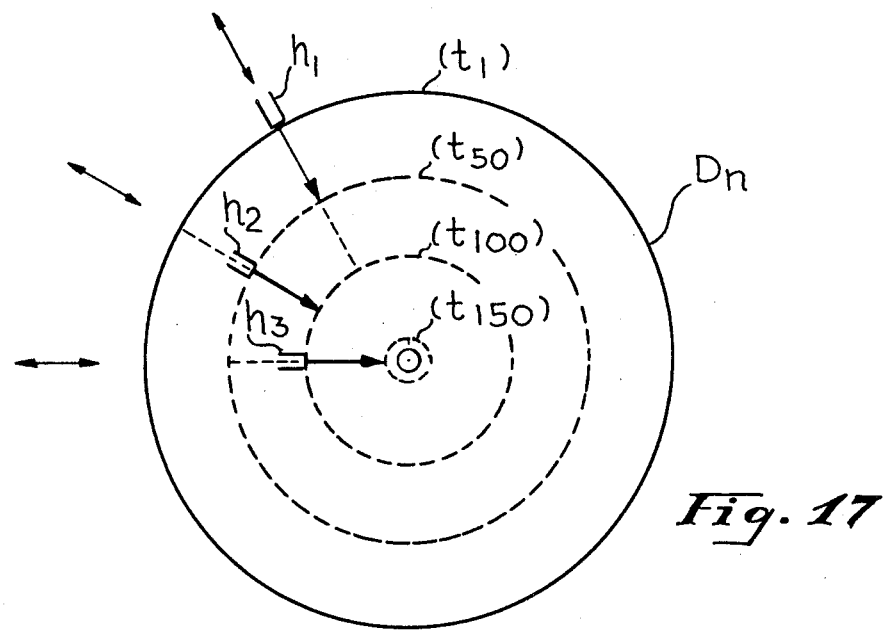
Fig. 17
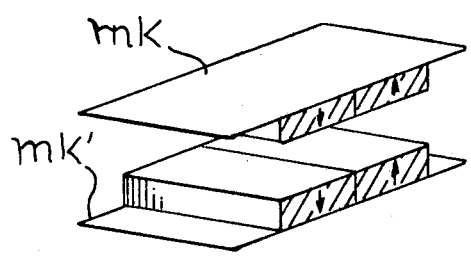
Fig. 18-A
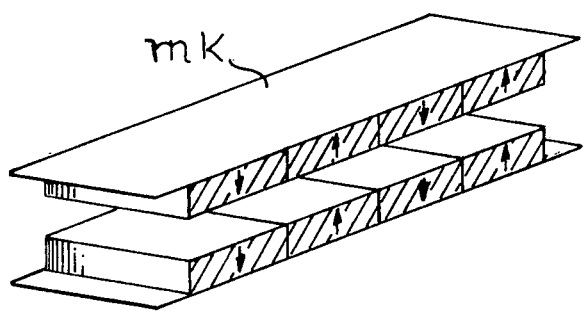
Fig. 18-B
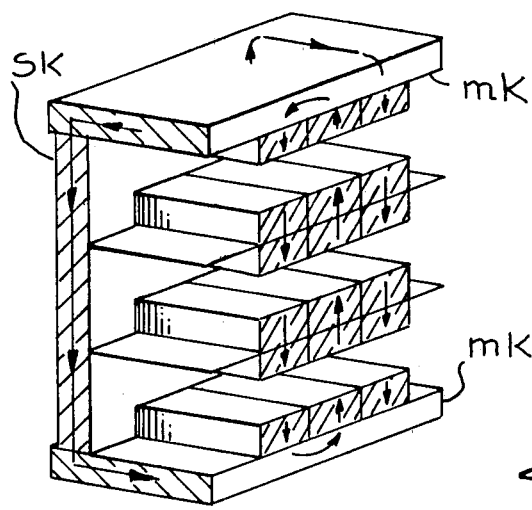
Fig. 18-C
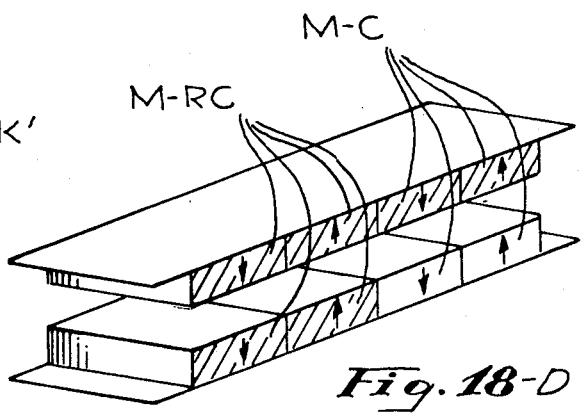
Fig. 18-D

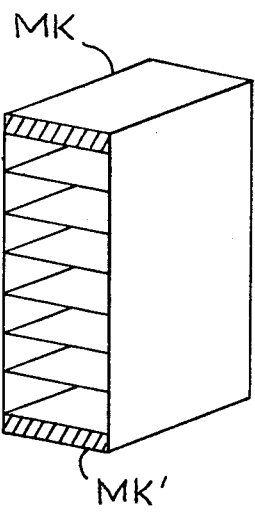
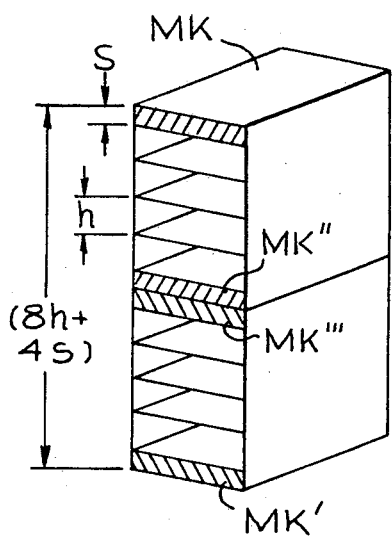
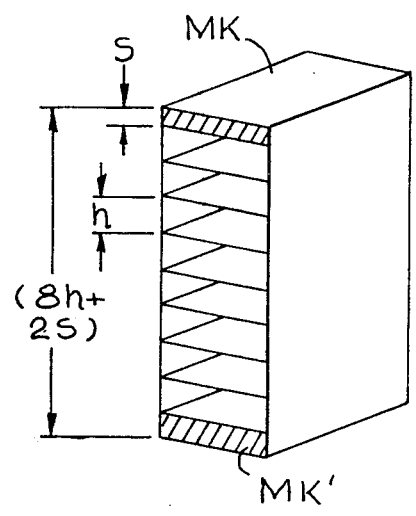
*Fig. 19-A*   *Fig. 19-B*   *Fig. 19-C*
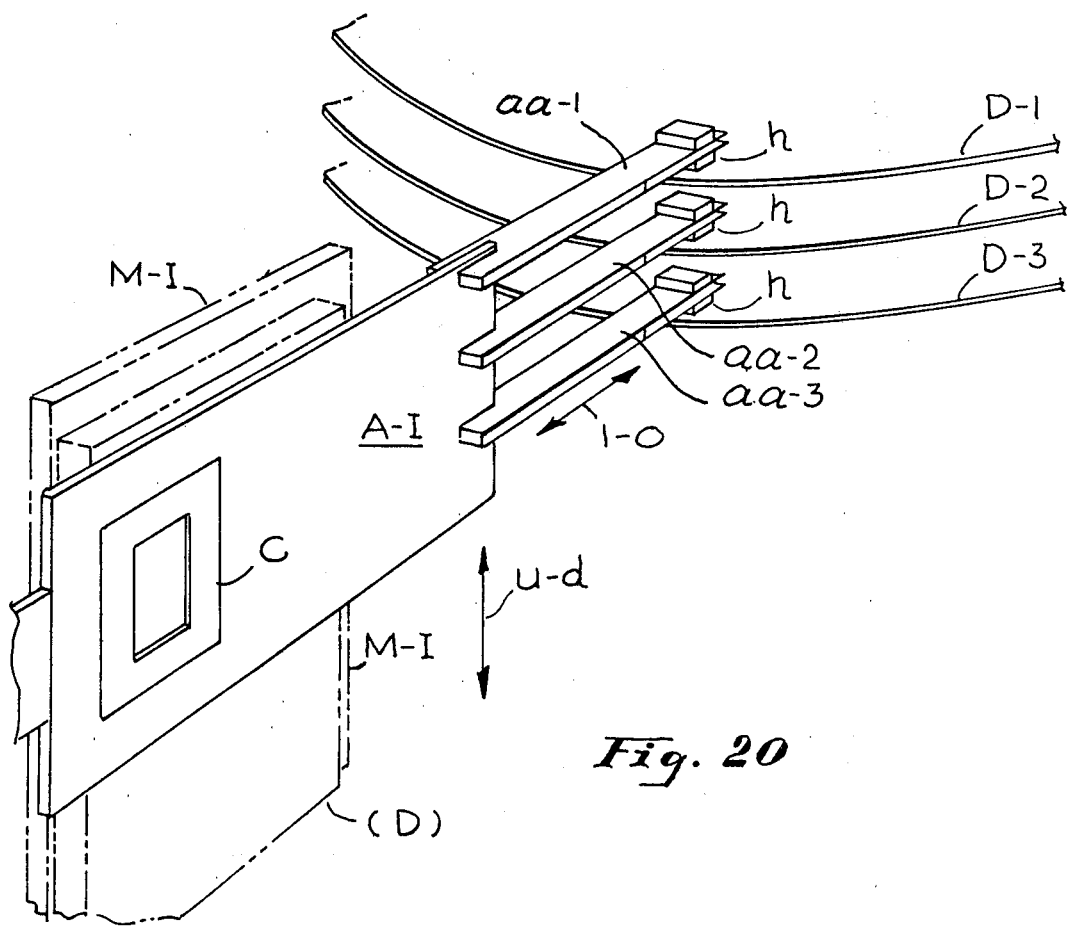
*Fig. 20*

FLAT COIL LINEAR ACTUATOR FOR MULTIPLE TRANSDUCER ARMS

BACKGROUND, FEATURES OF INVENTION

This is a Division of U.S. Ser. No. 085,945 entitled "Flat-Coil Actuator Array For Multi-Head Disk Drive" filed by Jorgen Frandsen on Oct. 18, 1979, now abandoned, and commonly assigned.

This invention relates to novel electromagnetic actuator.

Magnetic disk files for recording and storing data are widely used in data processing; e.g., as peripheral memory. Disk files have the advantage of facilitating data transfer at randomly selected address locations (tracks) and without need for the "serial seek" mode characteristic of magnetic tape memories.

As workers are aware, the transducers used in association with disk recording surfaces must be reciprocated very rapidly between selected address locations (tracks) with high precision. It will be recognized as important for such a system to move a transducer very rapidly between data locations; and to do so with high positional accuracy between closely-spaced track addresses. This constraint becomes very tricky as track density increases—as is presently the case. Typically, such disk storage systems mount the transducer head on an arm carried by a block that is supported by a carriage. This carriage is usually mounted on track ways for reciprocation by an associated transducer actuator.

Workers will recognize that the present trend is toward ever higher track density with increased storage capacity and decreased access time. Of course, as track density rises, closer control over the actuator mechanism is necessary to position transducer heads accurately over any selected track, lest signals be recorded, or read, with too much distortion, and without proper amplitude control, etc.

Known Positioners

Such transducer actuators (linear positioners) employed with magnetic disk memory systems are subject to stringent requirements; for instance, these systems typically involve a stack of several magnetic disks, each with many hundreds of concentric recording tracks spanning a radius of about 12 inches; and a head-carrying arm is typically provided to access each pair of opposing disk surfaces. This arm will typically carry two to four heads to that it need be moved only about 3 inches (radially) to position its head adjacent any selected track. Thus, it will be appreciated that such applications involve extreme positioning accuracy together with very high translation speeds (to minimize access time—a significant portion of which is used for head positioning). Such a positioner must move its transducer heads very rapidly so that the associated computer can process data as fast as possible—computer time being so expensive that any significant delay over an extended period (of even a fraction of a millisecond) can raise costs enormously ("transition time", during which heads are moved from track to track, is "dead time" insofar as data processing is concerned, of course). Thus, computer manufacturers typically set specifications that require such inter-track movements to take no more than a few milliseconds. Such high speed translation imposes extreme design requirements: it postulates a powerful motor of relatively low mass (including carriage weight) and low translational friction.

Another requirement for such head positioners is that they exhibit a relatively long stroke, on the order of 1–4 inches or more, in order to minimize the number of heads required per recording surface.

The prior art discloses many such positioner devices, including some intended for use in magnetic disk memory systems: e.g., see U.S. Pat. Nos. 3,135,880; 3,314,057; 3,619,673; 3,922,720; 4,001,889; 4,150,407; 3,544,980; 3,646,536; 3,665,433; 3,666,977; 3,827,081; and 3,922,718 among others.

Workers recall that such actuator carriages are driven by various actuator mechanisms, including the well known "voice coil" motor (VCM, comprising a solenoid like those used to drive an audio speaker). That is, the magnetic heads are carried by a sliding carriage driven by a VC electric motor including a mobile electric coil positioned in a magnetic field and fed by a current of variable intensity and polarity. This magnetic field is typically established by permanent magnet means disposed about the movable coil. Such a VC linear positioner can exhibit certain disadvantages—for example: excess mass and associated excess power requirements; and drive and control circuitry which is unduly-complicated. That is, such actuators typically involve a relatively heavy carriage; accordingly a lot of inertia must be overcome each time the carriage is accelerated from rest. This acceleration must be maximized to minimize access time. Thus, a great burden is placed upon the power requirements to the voice coil to provide the necessary high acceleration. Such VC actuators are not particularly efficient in converting electrical power either; also they typically require relatively complicated drive and control circuitry to effect the requisite precise positioning despite high accelerations.

FIG. 11 thus represents a conventional moving coil, magnetic actuator (VCM) very schematically shown (see also Fujitsu Scientific and Technical Journal June 1972, page 60 and following). Here a moving coil (armature) C will be understood as mounted upon a movable bobbin adapted to reciprocate along the core portion $M_c$ of an E-shaped magnetic circuit M, including opposing poles P connected by yoke section Y. Such reciprocation will be responsive to electric current through coil C as is well known in the art [cf. force being the product of flux density, coil length and coil current: $F = BLI$].

Workers are aware that, since the flux return path traverses the cross section of core $M_c$, then in certain instances actuator efficiency and the upper limit of operation will be affected by "flux saturation" at this relatively narrow piece—whereby an increment in coil current fails to produce a proportionate significant increase in actuator force. One might even say that such incremental current and flux is "wasted". Flux may also be deemed "wasted" insofar as the flux return path traverses yoke portion Y (an "open-loop" flux) rather than moving through the "working gap" between coil C and (the inner facing surfaces of) poles P (in a "closed-loop").

In accordance with one salient aspect of the present invention, such a transducer positioner is formed to comprise a "flat-coil" carriage. In one embodiment, the "carriage" is comprised of a thin, planar frame, or mandrel, on which flat-wire loops are laid—this replacing the conventional VCM core as well as its coil and bobbin. In such an arrangement, more of the flux return path lies across the "working gap", so that more return flux participates as "working flux". This dispenses with the usual tubular bobbin in favor of a flat mandrel support for the coil loops.

As seen hereafter, it will be readily apparent to workers how such a "flat armature" (flat support/flat coil) provides the moving coil structure for an improved linear actuator, compressing it and flattening it out, as well as facilitating a great reduction in mass and volume. Such an improved armature will be seen to give superior performance, e.g., as a disk head positioner with "closed loop" flux as compared with a VC motor. Now, while others have suggested the use of related coil structures which are somewhat flat thin and planar, no one has combined such with a linear array of permanent magnets (pole pairs) as further described below.

In accordance with another salient feature, such linear positioners are taught in operative combination with a disk drive arrangement. In accordance with a related feature, such a "flat armature" is applied to replace the typical bobbin coil and magnet of a voice coil actuator.

More particularly, according to such features such a flat coil actuator array is provided in integral relation with a direct-access disk drive apparatus. In such an apparatus the linear positioning "flat armature" operates responsive to electrical signals to its coils, causing it to carry heads between disk track addresses. Such a "flat armature" positioner will be understood and described below as comprising a movable, planar nonmagnetic frame on which coils are disposed, this frame being adapted to be reciprocated along the "magnet gap" between an array of stationary permanent magnet means responsive to certain current through the coil windings.

Thus, an electrical address signal to the coils may be directly converted into linear actuator motion providing high speed head translation. Such a "armature" will be seen to eliminate much unnecessary mass and reduce associated power and actuator volume. By this feature, the "flattened bobbin" becomes the carriage frame for carrying a set of recording heads and eliminates all intermediate means and their associated mass and complications.

In a related feature, it will be seen that such "flat armature" positioners, being configured to fit within the cross-section of a typical inter-disk gap, lend themselves to "modular" disk drive design—whereby individual head mounting arms and positioners and their associated positioning drive means and controls may be individually provided and made sufficiently independent to be added, or subtracted, virtually at will—as compared with conventional disk drive positioner arrays wherein the actuator arms, etc., are mounted and/or driven and controlled as a multi-arm assembly (the basis for the "cylinder" concept of disk pack data organization). Workers will readily recognize the freedom of design and/or retro-fit provided by such a modular concept.

Such a "modular" design also simplifies the provision of servo electronics for various disk drives having a different number of disks—for instance, a manufacture may offer a "two-disk"-, "four-disk"- and "eight-disk"- drives; yet he can use the same positioner and servo control assemblies in all variations; where before he would typically have to design and supply three different actuator and associated control arrangements.

Thus, one object of this invention is to provide the mentioned and other features and advantages. Another object is to teach the use of such "flat actuators" in transducer assemblies, especially as adapted for positioning heads in a disk drive. A related object is to adapt actuator cross-section to that of the inter-disk gap—providing a "planar actuator" for "planar gaps"; and teaching the use of flat actuator coils able to penetrate such gaps. Another object is to provide such "flat coil" actuators with a high percentage of useful magnetic flux.

A further object is to provide multi-arm disk drive positioners which are "modular".

Another object is to "miniaturize" head actuators for disk drives; a related object is to reduce their cost, weight and power consumption, while improving acceleration. Yet a further object is to teach the advantageous use of one or more transducer actuators and assemblies per gap pair (i.e., per pair of recording surfaces).

Another object is to teach the establishment of modules of disk surfaces and associated dedicated transducer assemblies, whereby system expansion or contraction is simplified. Yet a further object is to teach the use of such modules with independent transducer control whereby transducers can be operated independent and in parallel (e.g., one engaged in "read/write" while one or several others are "seeking" their next read/write address; or some heads positioned over oft-used tracks while others "seek" randomly).

Another object is to do so providing "multiple paths to data" (multi-port flexibility), with multiple transducer assemblies arranged to cover the same addresses, at least optionally, A further object is to reduce the number of heads per actuator (e.g., thus reducing relative "offset"; also, facilitating lower power consumption, with less mass to translate; also breaking-down actuator/head "coverage" with relatively few tracks per actuator (per head).

Thus, according to one general aspect, the invention may be viewed as a linear actuator arrangement comprising flat elongate planar carrier arm with one or several coils and one or more transducer means disposed thereon and adapted to be reciprocated along a linear path in the plane of this arm, and with permanent magnet means disposed along this path adjacent the coils. For example, as seen below, such an arrangement may comprise a multi-arm, multi-head positioner arrangement which is operatively associated with a disk pack. Here, the term "transducer" may be understood as directed to any transducer, or head, adapted to receive data signals to be recorded on a medium or to be read therefrom.

BRIEF DESCRIPTION OF THE DRAWINGS

The foregoing, and other related objects, features and advantages of the present invention will be better appreciated by workers as they become familiar with the following detailed description of presently preferred embodiments, these being considered in conjunction with the accompanying drawings, wherein like reference indicia denote like elements:

FIG. 5 shows an upper perspective view of one actuator embodiment of the type referenced above; while

FIG. 7 shows a single actuator of the type in FIGS. 5 and 6, as mounted for rolling reciprocation, while

FIG. 9AA is a functional plan view showing a typical coil for such an actuator and FIG. 9AB is a schematic side view of such an actuator in the manner of FIG. 6;

FIG. 11 is a very schematic side section of a prior art "voice coil" type actuator shown in FIG. 12 in partial end perspective; while FIG. 13 is a like view of related portions of a "flat coil" actuator according to the invention;

FIG. 14 is a very schematic plan view of a flat actuator according to the invention to functionally indicate current polarity; with an alternate coil arrangement being shown in FIG. 15 and with related differently-connected coil arrays being shown in partial perspective and side view in related FIGS. 16A/16A', 16B/16B' and 16C/16C';

FIG. 17 is a very schematic plan view of a magnetic recording disk with a functional indication of an "overlapping head"-track coverage technique useful with the present invention;

FIGS. 18A through 18D show, after the manner of FIG. 5B different arrays of permanent magnets varied in both the horizontal and vertical direction;

FIGS. 19A through 19C show variations, after the manner of FIG. 1B, of differently arranged stacks of actuator compartments; and FIG. 20 is a side schematic perspective of a modification of the present flat coil actuator used to drive a plurality of positioner arms rather than a single arm as in the prior embodiments.

DESCRIPTION OF PREFERRED EMBODIMENTS

Figure 1A:
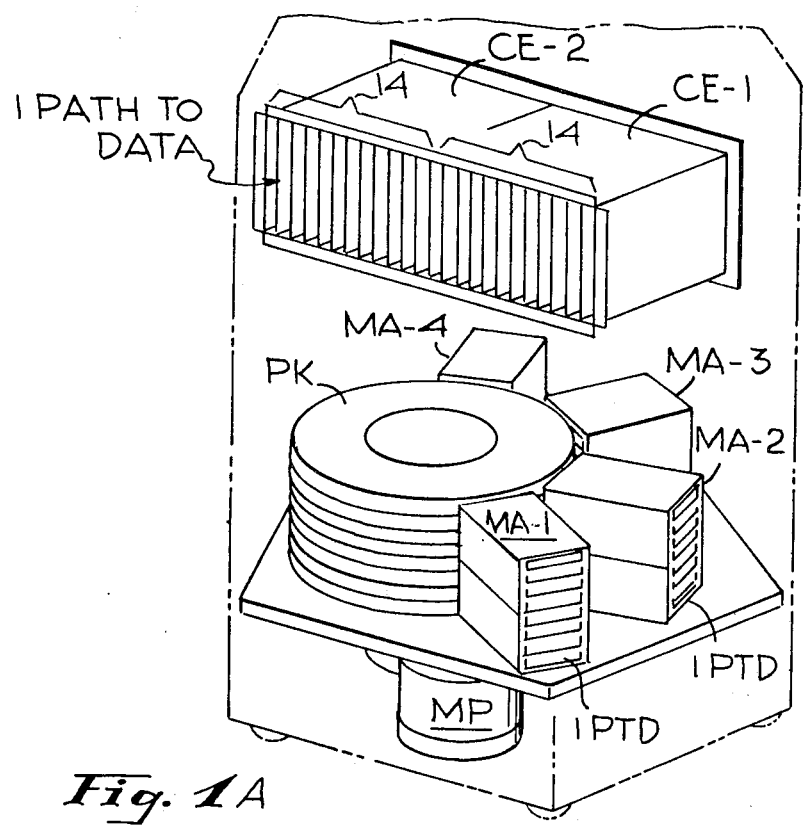
FIG. 1A is a perspective schematic partial view of an improved disk drive embodiment with several multi-actuator module embodiments, these shown in partly-disassembled perspective view in FIG. 1B and in a functional side section in FIG. 2, and very schematically in the front perspective in FIG. 3 and the rear perspective in FIG. 4.
Figure 1B:
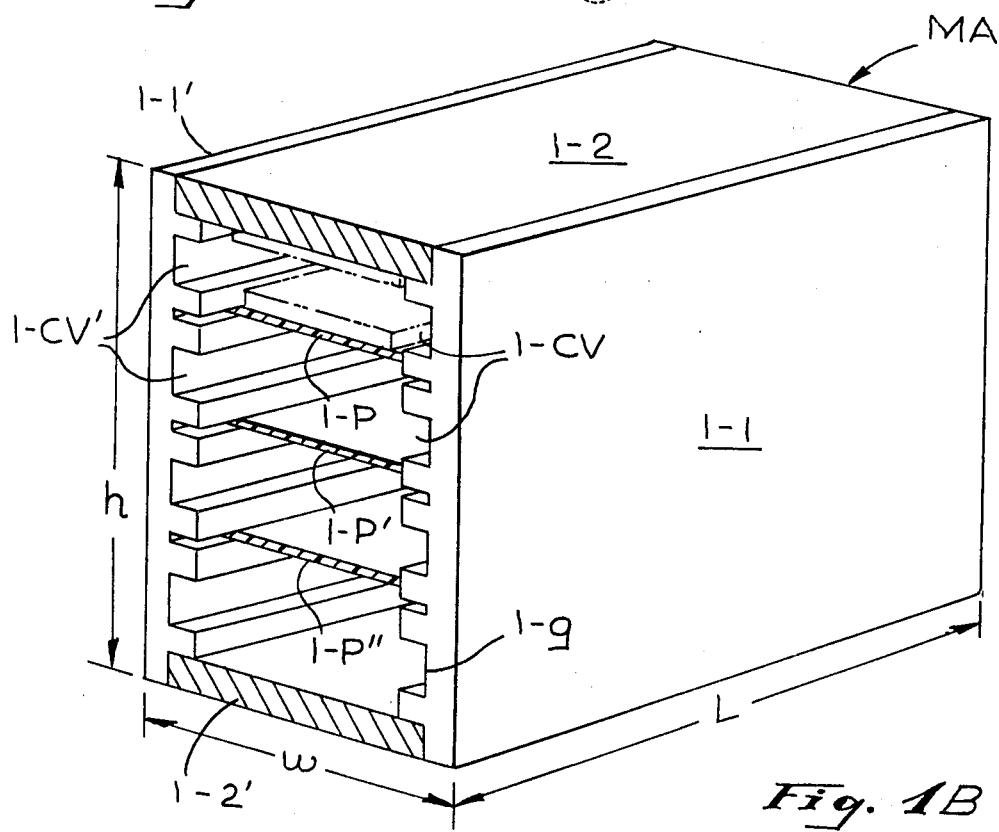

FIG. 1B is an idealized perspective view of salient portions of a novel "dual-path" disk drive comprising a rotatable multi-disk pack Pk arranged to be controllably rotated, e.g., by motor $m_p$, and otherwise operated relatively conventionally, except that it is operatively associated with a plurality of like actuator modules MA to be described hereafter. According to one feature hereof, this arrangement comprises a first stack of actuators MA-1 comprising 16 identical stacked actuators ("odd gap" stack) each designed to sevice one of the odd-numbered gaps in the 64 disk stack Pk, while a like "even stack" MA-2 comprises similar array of actuators, each designed to service one of the even-numbered gaps. Workers will appreciate that, here, two stacks rather than one are shown; this illustrating a feature of convenience with the invention. That is, rather than being stacked in a single vertical array, the flat coil actuators according to the invention are preferably broken up and organized into two stacks (as here) or into four stacks, etc., etc., as one may prefer.

According to a related feature, each of these stacks MA-1, MA-2 is replicated in a second set: "even stack" MA-3 and second "odd stack" MA-4, these equivalent to MA-1, MA-2, respectively, except that where the first two stacks cover the outer disk tracks principally, the second stack pair are designed to cover the inner (half of the) disk tracks. As a supplemental feature, all stacks preferably have a secondary ("backup") capability to sevice the entire track array (e.g., in case a companion actuator is disabled or otherwise occupied).

Figure 2:
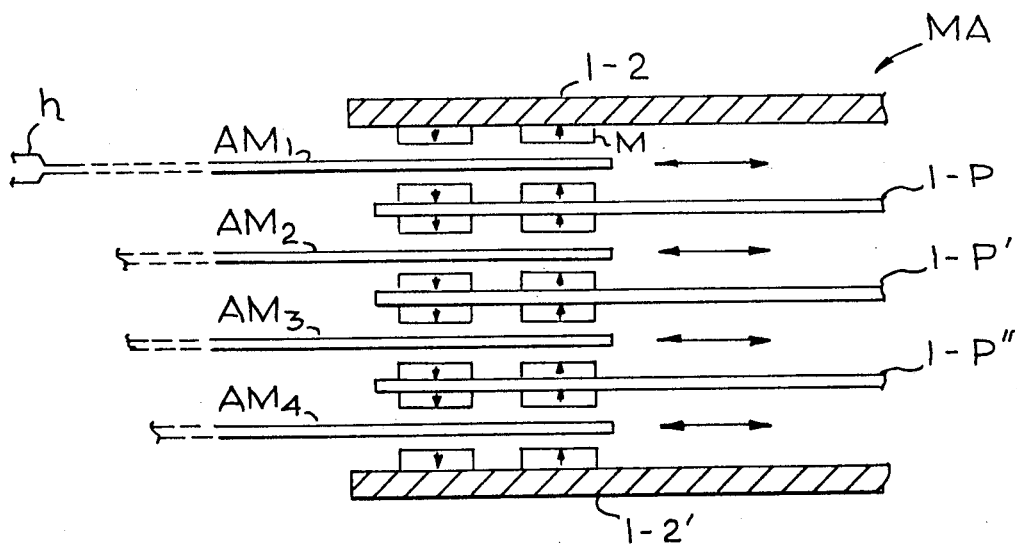
Figure 3:
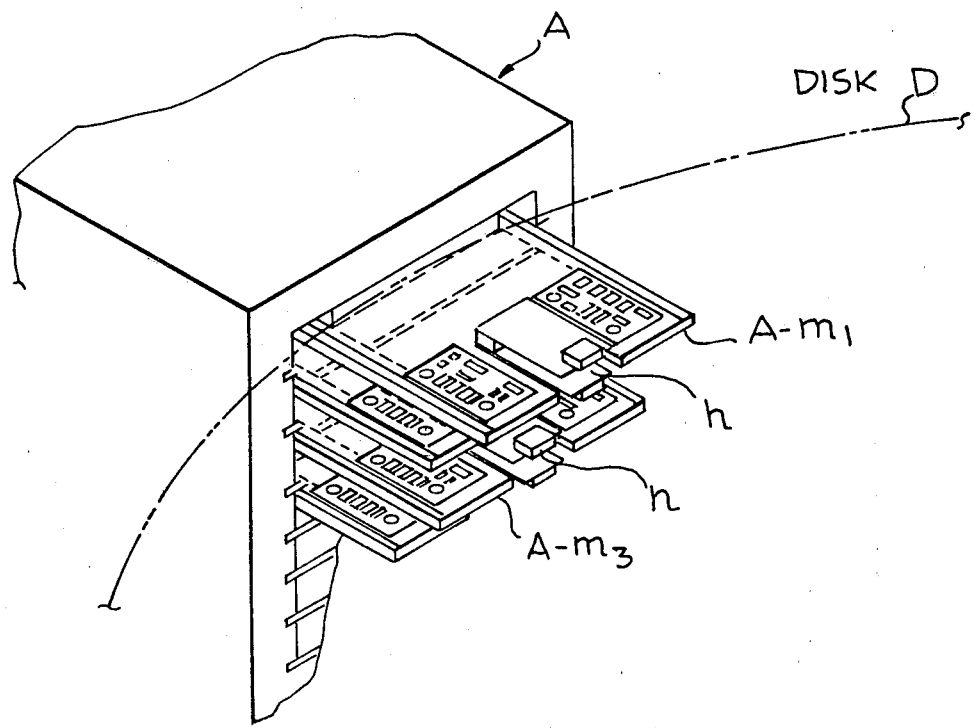

Attention is directed to FIGS. 1B-8 (especially FIGS. 3 and 4) where a single one of the actuator assemblies MA according to the invention, is shown. Each stack MA is arranged to provide a stacked module, or array of actuators and associated magnets and to provide positioner arm means for an associated set of transducer heads. Each stack MA will be understood as comprising a prescribed number of independent actuator strips A-m stacked vertically, each being adapted to be reciprocated along a prescribed carriage-way between a respective array of opposed permanent magnet pairs (see magnets m, FIG. 2) to position associated transducer means in a respective inter-disk gap. In FIG. 3, four illustrative actuator strips A-m1 to A-m4 are shown by way of example, with their forward, transducer-carrying ends adapted to project respective heads h into the disk stack (indicated in phantom and well known in the art).

Figure 7:
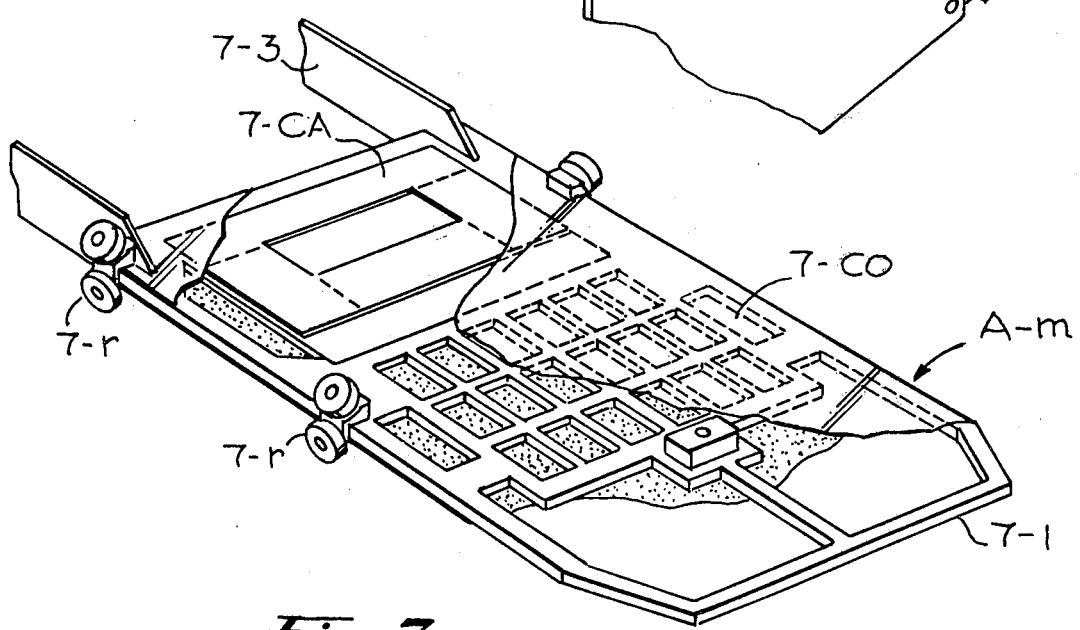
Figure 8:
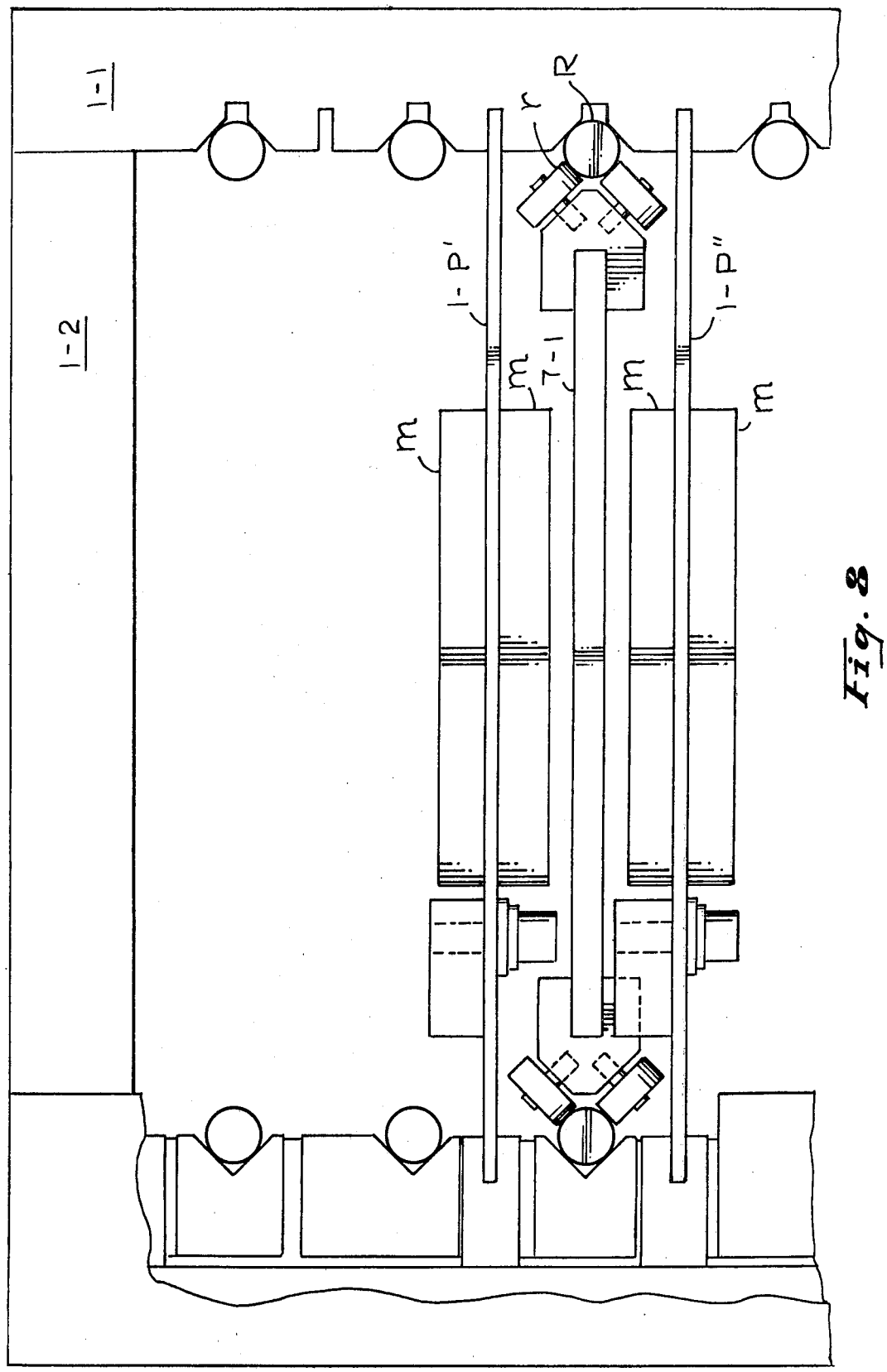
FIG. 8 shows this in frontal section and FIG. 9A shows individual actuator elements exploded-away vertically, these elements being separately shown in FIGS. 9B, 9C, 9D, 9E and 9F.

FIGS. 7 and 8 give a perspective view of a preferred embodiment of "flat coil" linear positioner A-m in accordance with this invention. Such an embodiment can be considered as comprised of two primary assemblies: the mobile armature-carriage assembly A-c essentially including the flat coils, head mount, roller bearing and support means; plus the fixed housing and permanent magnet structure A-g with the magnet shunts, sides, etc.

As shown in the drawings for purposes of illustration, the invention is to be understood as incorporated in a magnetic disk memory system, including a plurality of disks D in a conventional stacked array Pk, arranged in vertical spaced relation with a related stacked array of head assemblies h. Each head assembly h is mounted at the distal end of an armature carriage A-m to be reciprocated back and forth in its disk-gap relative to a respective pair of magnetic recording disk surfaces.

With selective positioning of each head assembly in a conventional manner, the "flat armature" (coil) means provided according to the invention, may be electrically energized to move into a retracted or extended position as known in the art (relative to the associated pair of disk surfaces) and read or record information on any selected track thereof. Thus, the head assemblies h are supported in pairs on actuator strip A-m, to be projected in cantilever fashion as part of a rolling carriage supported by rollers r and movable along track rails R. The reciprocating actuator assembly A-m, carrying coil C, is operable when coil C is current-energized in a conventional manner, to move the carriage along the associated cavity, toward and away from the disk stack between a plurality of precisely located addresses, these addresses, or track positions, determine the position of heads within the stack in the known manner.

Figure 4:
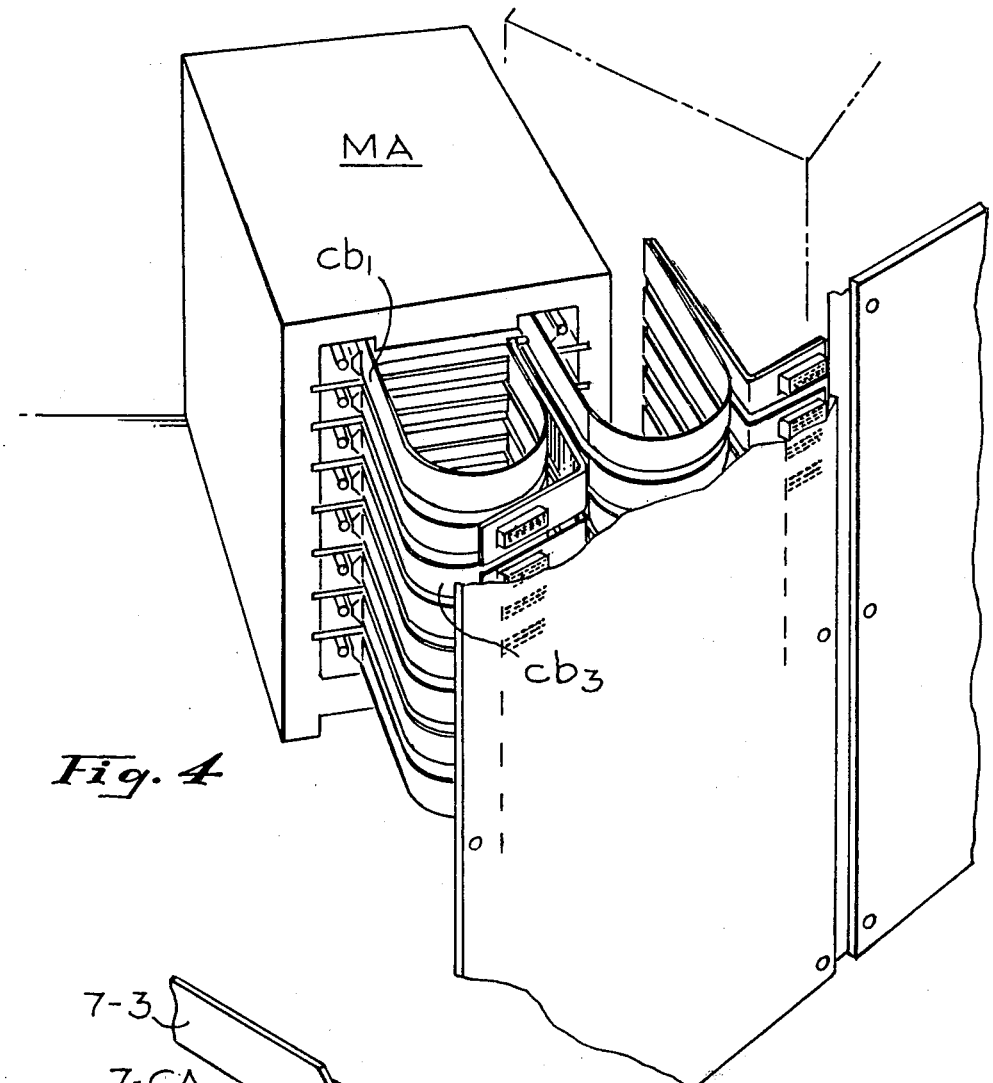

FIG. 4 indicates the opposite (rear) end of the actuators including their flexible connector (head cable) means CB-1, etc., and associated connections, these being provided conventionally and as known in the art.

For illustration purposes, one such actuator assembly module MA is indicated schematically in FIG. 1A where, for simplicity of illustration, the actuator strips, associated permanent magnets m, etc., are removed, except for magnets m shown in phantom. Actuator array MA is arranged according to the invention to house a prescribed number of identical stacked actuator assemblies (here, four places shown, each assembly being separated by a prescribed metal shield-support or partition 1-p, 1-p', 1-p"). Array MA is peripherally defined by a pair of metal sides 1-1, 1-1' connected and closed by a pair of (upper and lower) magnetic shunt plates (1-2, 1-2', respectively). Shunts 1-2, 1-2' are preferably comprised of cold rolled steel or other low reluctance material so as to offer a low resistance magnetic (shunt) return path for actuator flux.

The inner portions of sides 1-1, 1-1' are cut-out to form slots 1-cv, etc., or elongate linear grooves for receiving guide rails (see rails R in FIG. 8); these rails, in turn, to be engaged by a respective pair of roller assemblies r projecting from frame A-m—as indicated in more detail in the sectional view of FIG. 8, and the perspective of FIG. 7, for instance. The structure MA is preferably formed in a standard module with a prescribed standard height, width and length (h,w,l, respectively), such that these actuators may be stacked vertically. Thus, where a larger array of actuators is desired, the appropriate number of such modules may be added on, being stacked adjacent their associated gaps, (the number of compartments per stage is optional).

Figure 5:
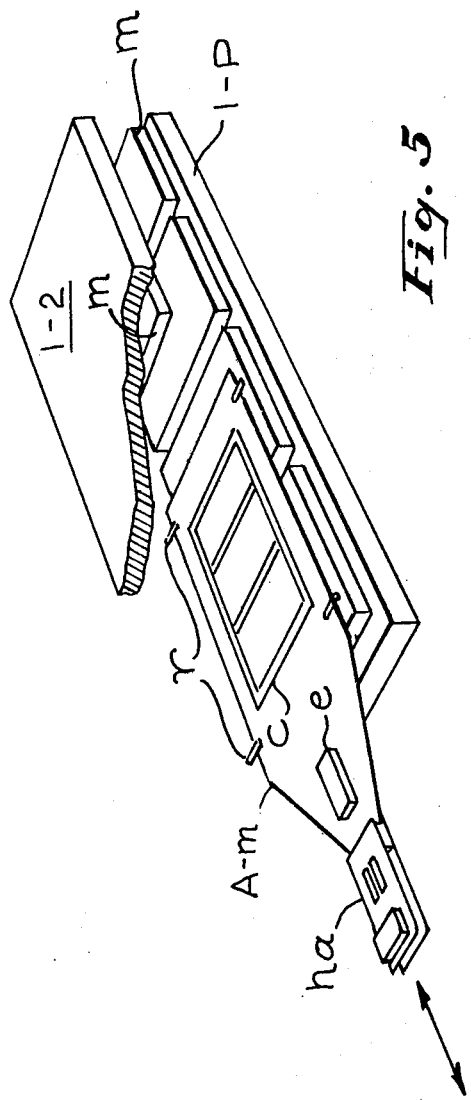
Figure 6:
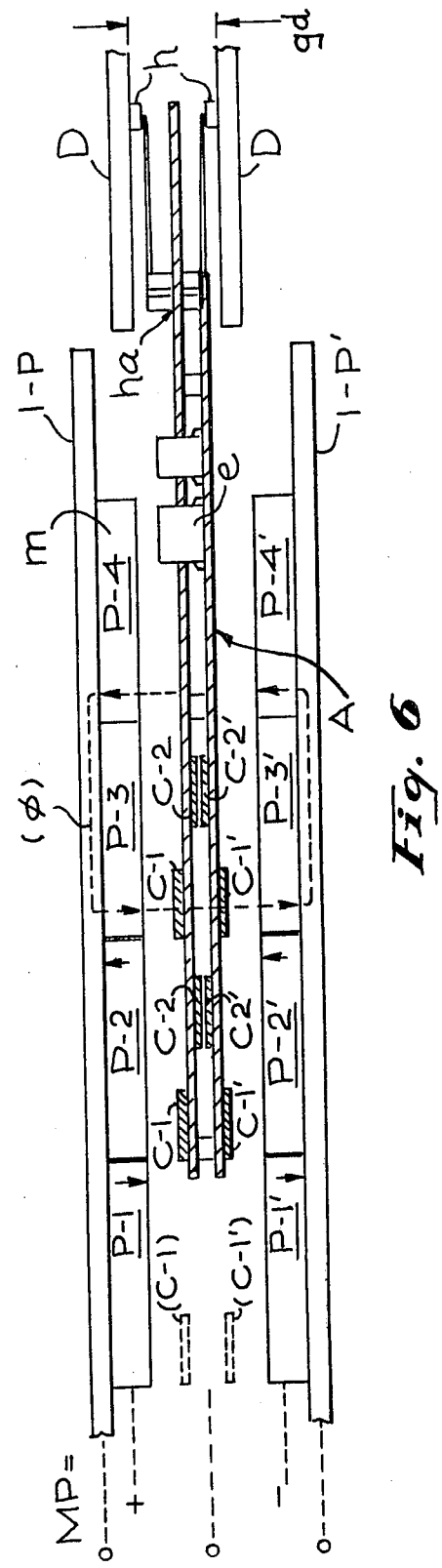
FIG. 6 shows the assembly in side sectional view.

As detailed in FIGS. 5, 6 and 7, each actuator strip A-m includes two double roller assemblies r on each side thereof (or two such opposed by a single third roller as an option, see FIG. 7). These dual-opposed wheels are adapted, as known in the art, to engage a respective guide rail R as indicated in FIG. 8, in rolling contact when the assembly A-m is translated along its elongate axis (in moving head assembly h relative to track addresses on a respective pair of disks D as well known in the art). Each actuator strip A-m is adapted to be so-reciprocated along a respective actuator cavity between opposed sets of permanent magnet poles m (here, four such pole pairs shown in FIG. 6A at P-1/P-1'; P-2/P-2'; P-3/P-3'; P-4/P-4'; see also FIG. 2 where four such actuator strips A-m1 through A-m4 are illustrated schematically as apt for reciprocation, when energized, along the strip's axis and between opposed sets of pole pairs).

FIGS. 5–7 also illustrate details of such a flat coil actuator strip A-m where, according to various further features of novelty, the strip is formed into a relatively thin, light-weight, planar body and is adapted to receive flat coil windings; (—preferably as a printed circuit board PCB, with two or more flat, overlapped coils C printed thereon). Electronic circuit means e is also preferably mounted on each strip A-m at the designer's option, (e.g., read/write electronics for the associated actuator).

Such a "flat armature" A-m will be understood to comprise a "planar trolley" carrying read/write heads h at its distal end and mounted on bearings to be reciprocated freely along a track between upper and lower relatively flat opposing pole pairs. The arrangement of magnets and housing, including magnetic shunts 1-2, 1-2' will be understood as forming a "closed" flux loop (return path) as mentioned, with flux direction as indicated in dotted line $\phi$. Here, as opposed to a VC motor, the flux return path will be seen as "contained" (not "uncontained" or substantially in-air, as with a VC motor), lying principally across the working gap, so that return flux participates as working flux. This design dispenses with the tubular bobbin and helical coils of a VCM—in favor of the flat mandrel or support on which the several flat conductor loops are placed. These loops will comprise one or several turns (preferably eight coils of eleven turns each and staggered with a 0.625" pitch, as indicated in FIGS. 9A–9F—these loops comprising a moving coil through which the activating current passes to generate the "working flux" which moves the unit.

Workers will be surprised how thin such an actuator can be (e.g., a thickness of about ⅜" is readily achieved using 1/16" PC board with copper cladding plus ⅛" thick magnets on 1/16" sheet metal, leaving an air gap of about 0.1").

The operation of such a novel, "flat coil" ("flat armature") actuator will be apparent to those skilled in the art; that is, the motor or linear positioner so formed will be understood as comprised of four flat plates (PC boards) supporting eight flat overlapped coils C with the head h and associated electronics e mounted at the front end of board A-m, and with bearings and associated rollers supporting the board edge for movement along respective rails. In operation, only one of the two overlapped coil-sets is energized at one time. Each coil set, when current is applied, interacts with four adjacent surrounding magnets (of the eight-magnet assembly see also FIG. 9AB). The magnets provide alternating flux in the air gap between themselves and the coil turns, such that a coil's "front" wire experiences flux that is directed oppositely to that experienced by its "back" wire. Thus, as the coil moves it will reach the boundaries of the flux area covered by these four driving magnets—at which time the second coil is enabled and takes over using the same four magnets. This action will be understood as providing a capability for "stepping" the flat coil actuator through the magnet assembly while still keeping a "linear region" associated with each step (Note: when such a coil is energized it moves in some direction until it reaches a "magnetic boundary"; then if the current is reversed, the coil moves in the opposite direction until reaching another "magnetic boundary"—the distance between these boundaries is the "linear mode region").

Workers will appreciate how compact, light and advantageous such a staggered multi-turn actuator coil array can be. For instance, as provided for a typical stack of magnetic recording disks, each such actuator would service the gap between associated disks; while stacked sets of such actuators will be grouped in modules wherein a common magnetic housing and circuit is provided (between shunts 1-2, 1-2', for instance, as noted in FIG. 1A, etc.).

Thus, for a typical disk stack with a typical inter-disk spacing or gap $g_d$ (see FIG. 6) of about ⅜" and with one such "flat-coil" actuator arrangement servicing each inter-disk spacing, the performance and dimensional constraints for practical, optimal head translation are readily accommodated. (E.g., in one embodiment using 1/16" PC board with 20 mil copper clad coils, and assuming inner gap clearance of about 1/10" inch, fast translation was seen.—Note above that the magnet poles P may, for instance, be formed of one-half inch thick ferrite, having a permeance coefficient of about 2.8; while shunts 1-2, 1-2' can be ⅜" cold rolled steel, with supporting plates 1-p, etc., comprising non-magnetic 1/16" steel sheet). The coils are preferably "overlapped" as illustrated.

With rare earth-cobalt magnets in such an array (90 gm. actuator) and with a gap flux of about 4 kilogauss, a very surprisingly low leakage has been observed (e.g., about 5 gauss at ⅜" vs. ordinary VC motor similarly used; 5 gauss at about 7"). Also, the excursion characteristics are surprisingly "flat". Preferably, the coils are "reverse-wound" and connected at centers (see below). The flux loops (see $\phi$) will be observed as nicely "contained" between adjacent opposed-polarity magnets (e.g., P-3, P-3'; P-4, P-4' shown) and the magnetic keepers or end plates 1-p, 1-p'. Thus, the magnetic potential (M.P.) as shown will be zero at the top, bottom and center of the array (FIG. 6A).

The working excursion of this actuator (FIG. 6A) should be viewed as:
1: from extreme left (c-1, c-1' in phantom) across P-1/P-1' to P-2/P-2' with coils c-1, c-1' working;
2: then, as coils c-2, c-2' (oppositely poled from c-1, c-1') start to sweep across P-2/P-2'-P-3/P-3'

Except as particularized, workers will understand that the foregoing elements are constructed and operated as known in the art (e.g., as specified in the cited references). Workers may be surprised to learn that embodiments like that here indicated have involved a total moving mass of only about 90 grams—this comprising the actuator strip, or PC board, pair of head assemblies, and pair of R/W integrated circuits, along with the four sets of double bearings, or rollers—a surprising low mass!

Figure 11:
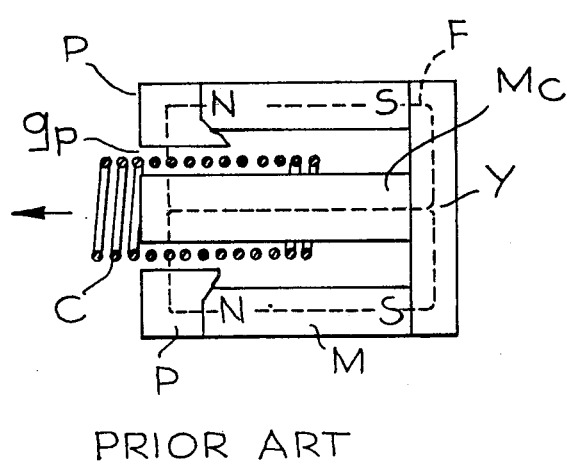

It will be apparent to workers how such a "flat armature" linear positioner simplifies the moving coil structure, compressing it and flattening it out, as well as making it possible to greatly reduce mass and volume. (E.g., as compared to a VC motor with its "open" (air traversing) flux path; see FIG. 11).

Such a "flat coil" actuator will also be seen as allowing for a relatively unlimited stroke length (according to the number of magnets strung out) this facilitating radical miniaturization and compression of the actuator stack (and thus allowing one simplified actuator between each pair of recording disk surfaces—i.e. per gap—according to a related feature)—the flat shape facilitating the close and intimate stacking of actuators in a rather surprising novel manner.

"One plus" actuators per surface-pair; "multiple path to data"

As is evident from the above (see FIG. 2 especially) this "flat armature" concept facilitates the use of one, or more, transducer assemblies per recording surface (pair). The evident reduction in actuator mass, cost, power, etc., will obviously encourage this. And workers will readily see advantages in such an "actuator-per-disk" array. For instance, no longer is it necessary to translate a heavy multi-transducer load, servicing "n" pairs of record surfaces, to shift one head on one surface! Also, while a first head is transducing, one (or several) other may, the-while, be shifted to a new address—thus avoiding wasted "access time" when the other head begins transducing (and the first ends).

This, in turn, facilitates a "multiple path to data" concept, whereby some, or all, tracks may be serviced by more than one head, and by more than one associated actuator—preferably having two heads per surface.

Such a "multi-ported" disk file concept is very schematically illustrated in FIG. 17, where one illustrative disk $D_n$ in a stack is shown to be comprised of 150 recording tracks—$t_1$, $t_{50}$, $t_{100}$ and $t_{150}$ being shown, in phantom, for illustration purposes. Certain groups of these tracks are to be serviced by a respective one of a trio of transducer heads $h_1$, $h_2$ and $h_3$, the heads to be actuated and controlled by appropriate mechanisms as known in the art (not shown here—it being understood that each of the disks D in a subject stack would be similarly provided).

Now, as indicated by the solid arrows, head $h_1$ is arranged to primarily service tracks $t_1$-$t_{50}$ (being positioned closely adjacent this group of tracks and normally reciprocated only across them—however being also adapted to be further translated to service tracks $t_{50}$-$t_{100}$ as a "backup" transducer. Thus $h_1$ might be characterized as servicing tracks $T_{50}$-$T_{100}$ in its "secondary operating mode" or "alternate operating mode". Accordingly for $h_1$ track $T_1$-$T_{50}$ would be the "principle set" and tracks $T_{50}$-$T_{100}$ would be the "secondary" or "alternate set". In a similar manner, head $h_2$ is disposed to primarily service tracks $t_{50}$-$t_{100}$, as well as arranged to also service $t_1$-$t_{50}$ as a "backup" to $h_1$ (and/or $t_{100}$-$t_{150}$; likewise head $h_3$ is adapted to principally service tracks $t_{100}$-$t_{150}$, while also optionally covering tracks $t_{50}$-$t_{100}$ (and/or $t_1$-$t_{50}$) as a "backup" head.

Thus, data along any particular track will have at least one alternate "port" (for data input/output), or transducer head arrangement for servicing it in case its primary transducer is unavailable (e.g., being busy elsewhere or damaged and inoperative, etc.). Thus, for example, head $h_1$ might be transducing on track $t_{49}$ and the current program call for track $t_{47}$ might be transduced next—in which case an optimized program would call head $h_2$ into service for this rather than head $h_1$ (assuming head $h_2$ was not otherwise occupied and was then available); thus head $h_2$ would be translated to track $t_{47}$ during the time $h_1$ was transducing on $t_{49}$. Quite evidentially this would avoid the "dead time" that would have resulted if head $h_1$ were used to service both tracks (avoid need to suspend data processing and input/output while $h_1$ was translated from $t_{49}$ to $t_{47}$). Workers will, of course, conceive of many other instances in which such "multi-head servicing" of data tracks is particularly advantageous. Also, it will be apparent that the aforementioned "flat armature" design for transducer-actuators is particularly apt for providing this.

Formation and Operation of flat coil armatures; FIGS. 7, 9A-9F and 9AA, 9AB

Figure 9B:
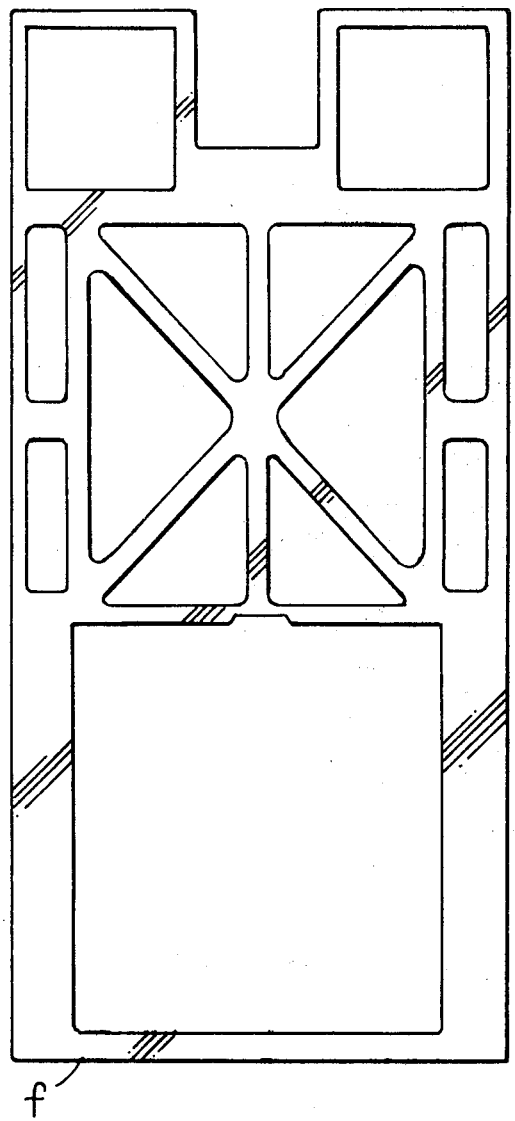
Figure 9C:
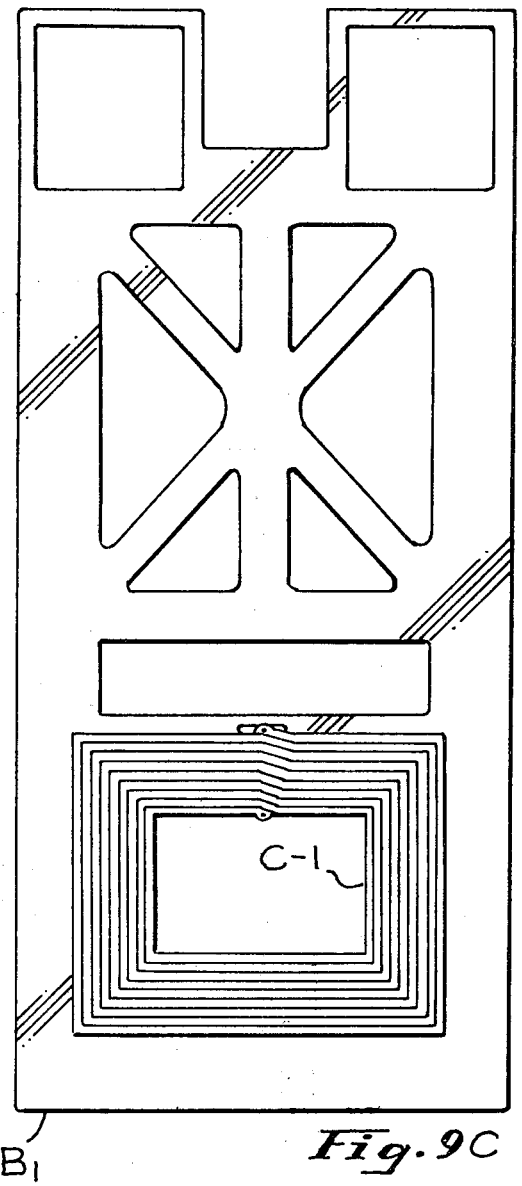
Figure 9D:
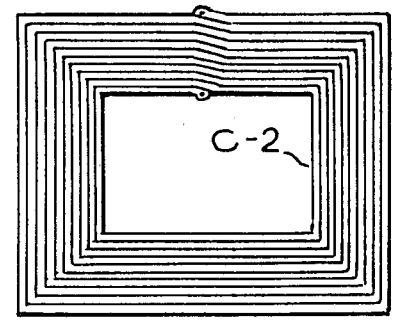
Figure 9E:
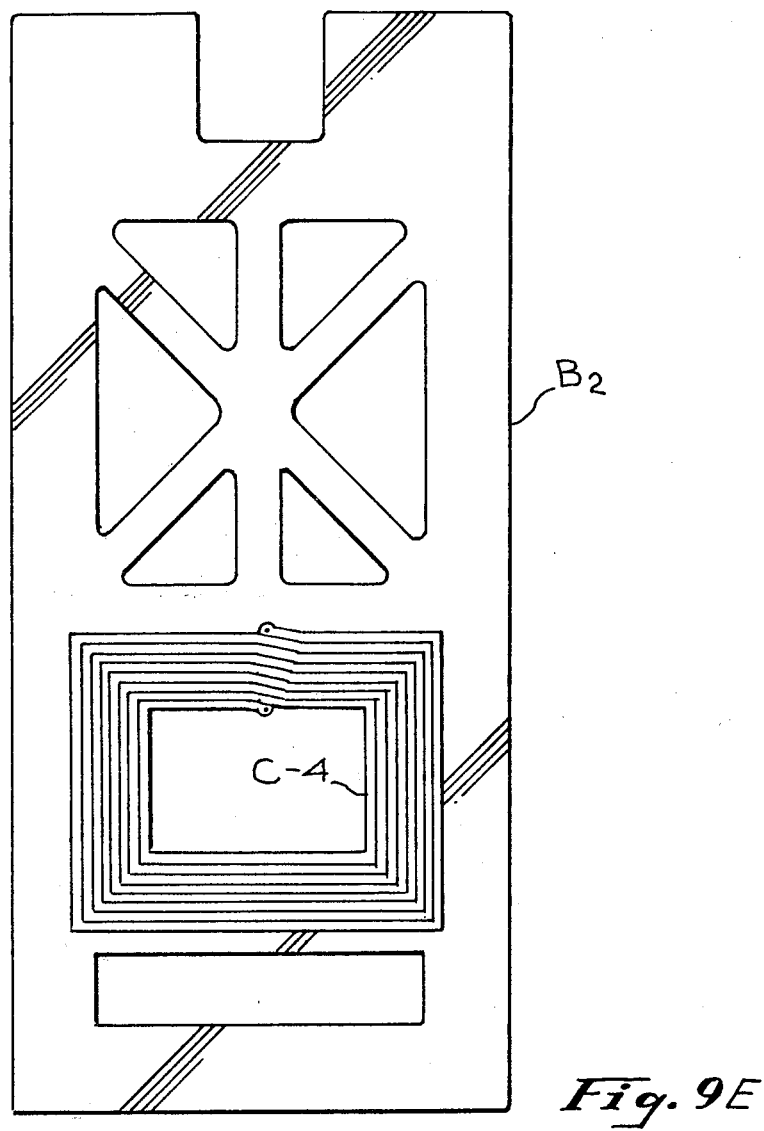
Figure 9F:
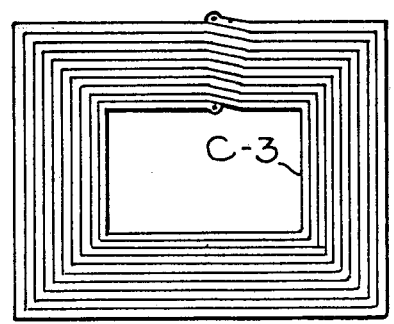
Figure 9A:
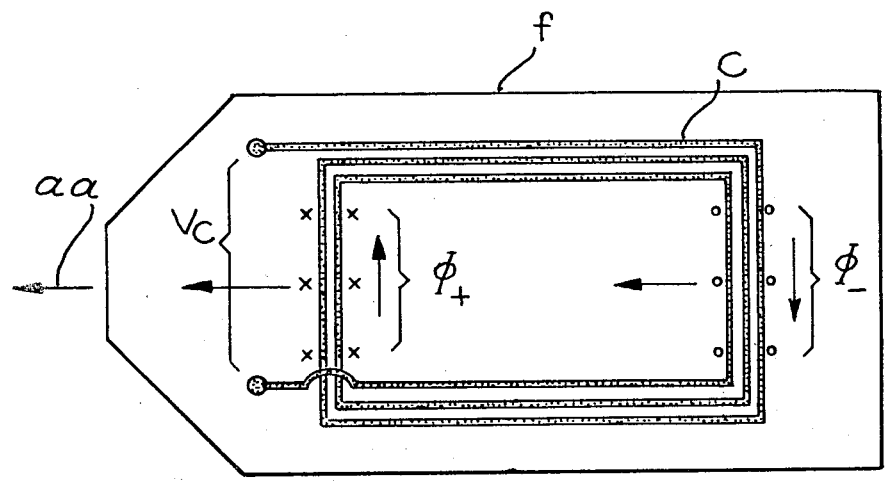
Figure 9A:
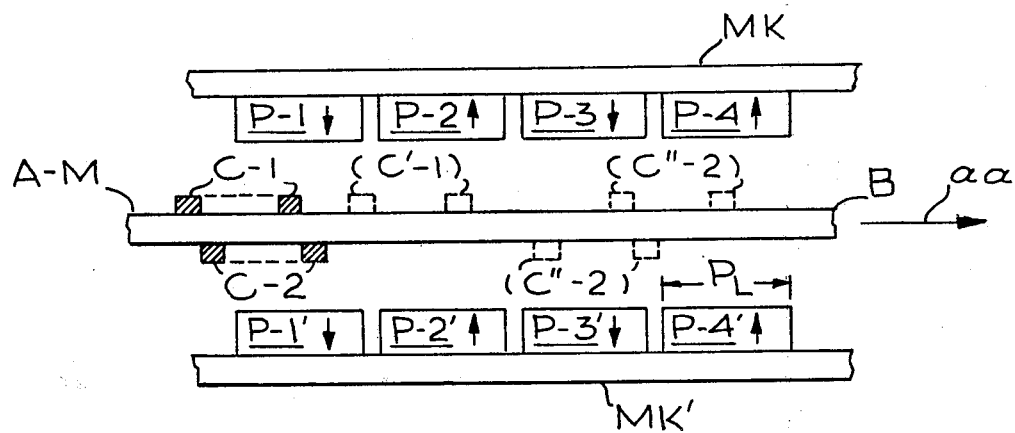

A preferred construction and mode of assembly for flat coil armature embodiment A-m in FIG. 7 is indicated in a form of a layup in exploded view in FIG. 9A, with the several parts thereof being indicated in FIGS. 9B, 9C, 9D, 9E and 9F, while an operational representation is indicated in FIGS. 9AA and 9AB, FIG. 9AB also illustrating the preferred coil offset or overlapped relation.

More particularly, in FIGS. 9A and 9B will be seen an upper view of the frame f (of epoxy-glass, about 0.6 inches thick) to which the PC boards, coils, rollers and connectors, etc., are to be attached (or a non-ferrous metal may be used, preferably with all "rings" gapped with a dielectric). The structure and operation of these and other parts described will be understood as conventional, except as otherwise described. Frame f will be seen to be cut-out along its cross-section wherever possible (wherever the necessary rigidity and cross-sectional strength admit). A pair of PC boards, $B_1$, $B_2$ are to be placed respectively above and below frame f, each board carrying two pair of flat printed-circuit "overlapping" coils C (one on its top, the other on its bottom face) in opposed offset relation (though this is optional).

That is dual-coils C-1, C-2 are disposed on the top and bottom of upper board $B_1$ and coils C-4, C-3 disposed atop and below the bottom PC board $B_2$. Opposed pairs of rollers r (bearings) support the frame for rolling reciprocation. A conventional head assembly (pair) is carried (not shown) along with associated electronics (e.g., see R/W chip 7-5). Flexible cables 7-3 couple the structure electrically to the outside and may include return-spring means.

In operation, and as very generally indicated in FIG. 9AA, each such flat coil C (only one coil shown for simplicity) will preferably comprise a multi-turn printed circuit exhibiting a rather advantageous mode of interaction with adjacent magnetic flux (intersecting the coil turns and emanating preferably from sets of surrounding permanent magnet poles as indicated in FIG. 9AB and elsewhere). Thus, once an energizing voltage $V_c$ is applied across the terminals to coil C, current will flow in the directions indicated by the arrows, and, with oppositely directed flux $\phi$ (indicated as $\phi_+$ and $\phi_-$ in FIG. 9AA), the actuation impulses will be additive, tending to thrust the overall structure f unidirectionally as indicated by arrow aa.

This is indicated rather diagrammatically in FIG. 9AB, where a flat coil armature A-m of the type described in the above embodiment is shown very schematically and in cross-section. Here, A-m includes a pair of opposed-offset coils C-1, C-2 disposed on opposite sides of a supporting board. Coils C-1, C-2 are identical and shown in schematic operative relation with a linear array of opposed permanent magnet pole pairs of the indicated polarity (see arrows). Each coil has an inner diameter ($C_{1D}$) approximating the common length ($P_L$) of any pole along the translation path (arrows aa), less a pole width ($C_w$)—i.e. $C_{1D}=P_L-C_w$. The pole pairs should be an even number and may, advantageously, extend virtually any distance with such a construction—a decided advantage over conventional actuators such as a VCM. Low reluctance shunt caps MK, MK' (e.g., of steel) help close the flux paths efficiently, minimizing the in-air flux-paths.

In operation, coil C-2 may be assumed to be energized with a certain drive current ($+i_d$) to begin translating armature A-m in the direction of arrow aa. When coil C-1 passes beyond poles P-1, P-1' and reaches position C-1', or before, the current ($+i_d$) to coil C-2 is terminated and an opposite-polarity current pulse ($-i_d$) is sent through C-1 (while C-1 passes pole P-2, P2'). Coil C-1 then goes "quiescent" and C-2 is re-activated—and so on, until the armature reaches the end of this excursion (indicated here as the position of C''-1, C''-2—however, if less than "full power" is acceptable, the excursion may be extended somewhat in both directions, as workers know).

Workers will recognize many features of novelty in such a "flat linear actuator"; for instance, its thin planar cross-section (tailored to disk gap dimensions), the aligned magnet pairs, the overlapping coils.

Results

Such a "flat armature" (printed circuit) actuator will be seen as advantageous by those skilled in the art, whether developed according to the above described embodiment or in a different related manner according to the subject teaching. Such a "flat actuator" is obviously apt for use in a "multi-actuator" array, with a plurality of actuators (and heads) available for each disk surface (or pair thereof)—i.e., with a plurality available per track as a preferable option. Such a "flat actuator" lends itself readily to the "multi-actuator" concept (e.g., as suggested in FIG. 1A) especially as opposed to existing designs.

Figure 10:
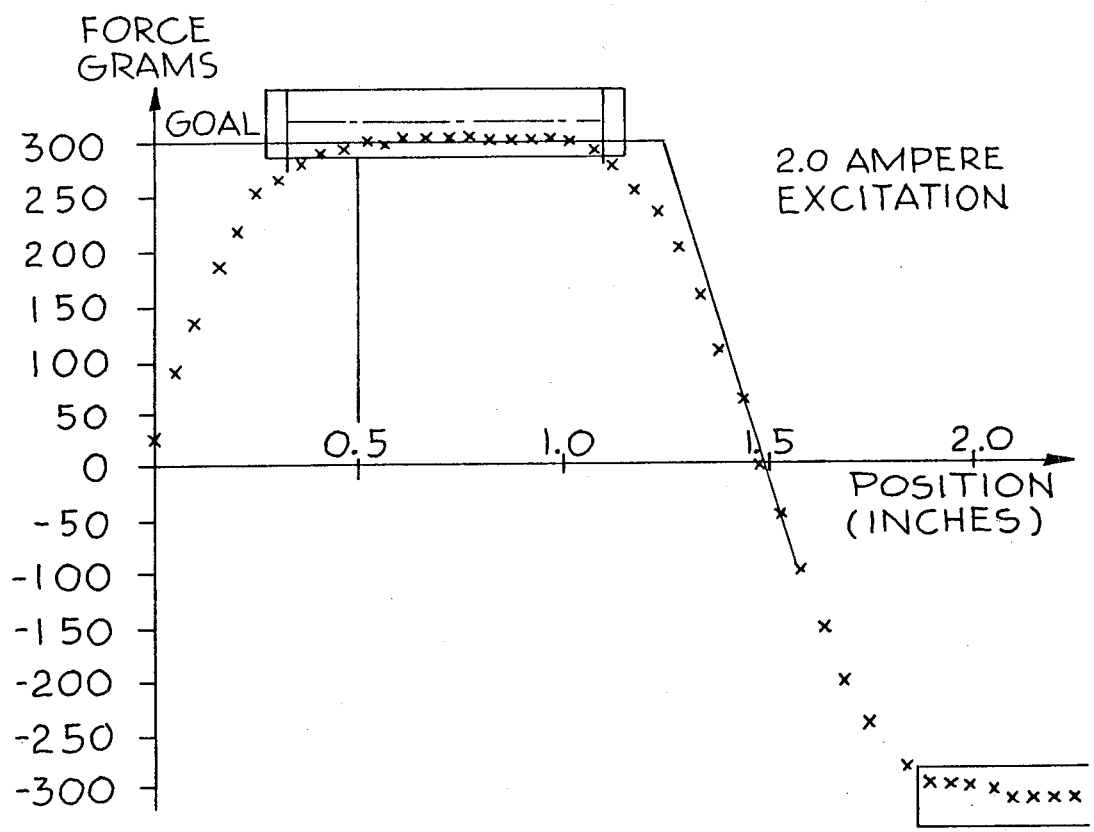
FIG. 10 is a plot of typical variations of actuator position with (magnetic) translational force.

As a qualitative example of the kind of results that can be achieved, consider FIG. 10, a plot of actuator force vs. head position for an actuator using (2.0 ampere excitation current).

NOTE: a translational force of 250 to 300 grams is quickly developed and sustained to be relatively constant over a translation excursion of about 0.3 to 1.3 inches—the next cycle beginning about 1.5 inches wherein the second set of coils takes over.

Figure 12:
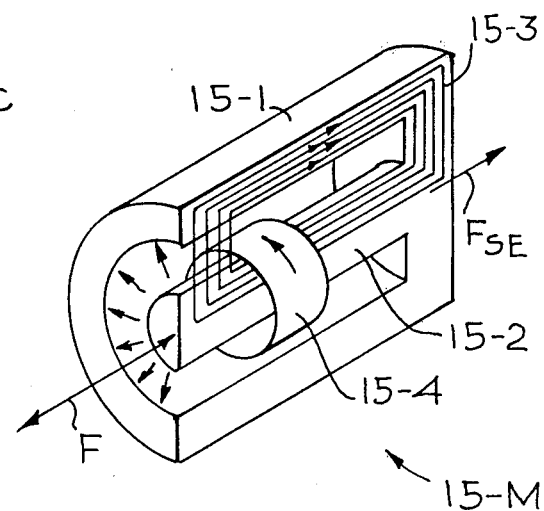

VC Actuators compared; FIGS. 12, 13

FIG. 12 depicts, very schematically, a relatively conventional cylindrical solenoid 15-M (of the VC-M type, as in FIG. 11 also) comprising a permanent magnet source of magnetic flux comprised of a cylindrical, or semi-cylindrical, shell 15-1, with an inner core 15-2, core 15-2 being encircled by a moving solenoid coil 15-4. Coil 15-4 will be recognized as conventionally translated along core 15-2 when energized with current (due to inductive interaction with the magnetic flux—see arrows emanating between core 15-2 and peripheral magnet parts 15-1). Force arrow F indicates the resultant reciprocal translation forces so developed—the force direction being determined by direction of current through coil 15-4, as well known in the art.

The magnetic flux field set-up by coil current will flow mainly through the "path of least reluctance" (as indicated by flux loops 15-3 through magnet 15-M). I have found that "flat armature actuators" of the true type described above operate somewhat differently. As indicated rather diagrammatically in FIG. 13, one may, simplistically, consider such "flat-armature" devices as comprised of a flat coil CCL (any number of turns) arranged to be energized and movable along a path between opposed magnet pairs, such as pairs A, B and C, in line. (Loop CCL here indicated as spanning section B and part of C). Considering the inductive energy stored in the air gap between these magnet poles, and intersected by the loops of coil CCL, the total energy in the system may be described as the sum of energy across segments A, B and C.

Now, if coil system CCL is moved "Forward" (in the direction indicated by the arrow, to the position CCL', shown in phantom), it will obviously span less of the working cross-sectional flux through segment C, while adding a corresponding amount from segment A, with that through segment B remaining unchanged. Thus, when the volumetric inter-gap flux densities are summed after such an incremental step, it will be found that the new energy is the same.

Hence, one can say that such movement of a "flat coil"armature involves no transfer of energy, unlike the "cylindrical actuators" indicated in FIG. 12 above. Workers will appreciate this advantage.

Alternate coil configurations; FIGS. 14, 15

FIG. 14 indicates very generally, and in plan view, a pair of opposed-offset (overlapping) coils C-A, C-B, mounted on a "flat armature" A-m and adapted to function in the manner of the above described embodiments. That is, the two opposed "end segments" of coil C-A (see arrows) are shown as relatively directly intersected by the flux of an adjacent pole pair (at this point in the translation cycle); while the end segments of companion coil C-B will intercept little or no such magnetic flux. Thus, one can say that coil C-A is "active", here; while coil C-B is now "quiescent" (during this portion of their excursion cycle). Thereafter, as the coils move and the flux leaves the confines of the C-A segments, it will begin to more directly intersect the end segments of coil C-B—then coil C-A will have turned "quiescent" and coil C-B become "active", to thereby maintain the driving force and continue the translation of armature A-m. Thereafter, upon further coil movement, coil C-A will again turn "active" and C-B "quiescent", etc., etc., as described above.

Workers in the art will perceive that while the "opposed-offset", overlapping printed coil construction indicated in described embodiments is rather advantageous and practical for many applications, there are other ways of implementing this concept and achieving similar results. One such alternate way is (very schematically) indicated in FIG. 15, (in the manner of FIG. 14). Here, a related "flat coil" armature A-m will be understood to include one or several adjacent coil "loops" L-1, L-2 shown for wires CC disposed thereon (as opposed to the "single-loop" coils C-A, C-B in FIG. 14, each of which is drawn about a common perimeter). As indicated in FIG. 15 each such printed circuit wire is to be extended along the actuation direction to define this "Multi-loop" version of such "flat armatures".

Coil-coupling variations; FIG. 16

FIGS. 16A, 16A' show schematically (perspective and section respectively) a single coil (replicated each side) 2 layer construction wherein the (printed circuit) coils will be understood as "reverse-wound" and through-connected (C-a to C-b) at their centers. FIGS. 16B, 16B' are similar and show a variation: a "dual coil" (2 separate coils); single layer assembly wherein C-d and C-e are connected to separate input terminals.

FIGS. 16C, 16C' are similar and show another, highly preferred variation: a "dual coil/4 layer" assembly yielding eight coils effectively and deriving more turns per coil. (C-f through-connected to C-g at center; then C-g to C-m at ends; thence C-m to C-n at centers; and C-h to C-j at centers; thence C-j to C-k at ends; thence C-k to C-l at centers).

Different magnet arrays; FIGS. 18

FIG. 18A shows, schematically, a 4 magnet (2 opposed pair) actuator array comparable to that of FIG. 2. FIG. 18B similarly shows an 8-magnet (4 opposed pairs) array comparable to that of FIGS. 5 and 6—both having magnetic keeper plates, mk, mk' as above mentioned for flux conservation.

FIG. 18C shows three actuator compartments, each with a 6-magnet array (3 opposed pairs) plus a side-keeper sk for closing the magnetic circuit. Such an "odd pair" configuration is less preferable than "even-pairs" (multiples of 4 magnets preferred).

FIG. 18D is another variation comprising (for each actuator) a bi-functional array of magnets: one set of high-performance magnets (e.g., rare-earth/cobalt magnets M-RC) for "normal" fast operations, over a normal excursion; plus a second set of inexpensive, low-performance magnets (e.g., ceramic magnets M-C) for exceptional or emergency operations. For instance, as used in a "dual path-to-data" disk drive, as noted above, such actuators would be understood as normally operating over a short (e.g., 50 track) excursion—this defined by high strength expensive magnets M-RC. But for optional occasional use, over an extended stroke (e.g., 100 tracks, when companion actuator is "busy" or "disabled"), the actuator (coils) would travel beyond the region M-RC into that of magnets M-C as well. For such occasional, emergency operations the degraded performance to be expected with magnets M-C (e.g., slower translation) is acceptable, and justified by the cost-savings.

Various actuator-stack configurations; FIGS. 19

FIG. 1B shows schematically, a 4-compartment stack, for four "flat coil" actuator units, with top and bottom flux-shunt plates. Compare the 7-compartment unit of FIG. 19A and the 8-unit array of FIGS. 19B and 19C. FIG. 19B really combines two 4-unit modules as in FIG. 1B; but in 19C the (redundant) center shunting plates (mk", mk'") are eliminated, with reduction in height, weight and cost, but no sacrifice in performance.

Multi-arm "flat coil" actuator; FIG. 20

FIG. 20 shows in very schematic perspective, a variant use of the "flat coil actuator" of the invention. Here, a plurality of arms (3 shown, number optional): aa-1, aa-2, aa-3 are shown all mounted in common from a single "PCB coil" actuator comprising board A-I with coils (C etc.) as before indicated. Large permanent magnet plates M-I, M-II surround the (coil portion of) board A-I and are adapted to cause it to reciprocate (arrow c-o) when the coils are energized, as before. This will, of course, drive associated head assemblies to a prescribed common position adjacent respective disk surfaces (D-1, D-2, D-3).

However, according to a related feature board A-I is mounted and arranged (by conventional means, not shown) to also be reciprocated vertically (arrow v-d) by conventional means, (not shown).

Conclusion

Workers will appreciate how aptly such flat armature actuators are combined to drive transducer assemblies for disk drive apparatus and the like. In particular it will be appreciated that such actuators function to reduce the size, the weight, the power and the cost of a transducer actuator and increase its speed (acceleration) accordingly—something workers in the art are now fervently awaiting. Workers will also appreciate that such actuators may be used to reciprocate other similar loads in related environments.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to tape systems and the like, as well as to drums, etc. Also, the present invention is applicable for providing the positioning required in other forms of recording and/or reproducing systems, such as those in which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. An improved disk file including multiple disk means, each comprising one or more recording disks, each disk presenting at least one recording face which includes "1 through n" adjacent track sites, each track site having a different radial location relative to the common center axis of the disk;

and two or more radially movable transducer/actuator arrays, each array being disposed at a unique location about the disk means and being arranged and adapted to present at least one R/W transducer means to each disk face, or set of opposing faces, and adapted to operate independently whereby to translate one or more read/write gaps of each transducer means across selectibly-variable distances so as to "cover" and access all, or a given subset of, the track sites on the associated face, at least in its "principal" operating mode;

whereby the track-coverage is differently apportioned between arrays and operation and track coverage of one such array is not necessarily related to that of any other such array and whereby a shift between track sites is enabled such as to facilitate "multi-access" to every track site, avoiding the continual need to translate any one transducer means across the full span of said 1 through n track sites and also whereby this file presents a capability for "multiple path to data" and for multiple transducer coverage of every track site.

2. The combination as recited in claim 1, wherein said disk faces are provided in a stack of identical disks, each having "1 through n" common track sites, there being T number of separate transducer/actuator arrays, each such array being arranged and adapted to cover a different radial sector spanning a unique set of adjacent track sites, at least in its "principal" operating mode.

3. The combination as recited in claim 2, wherein each transducer/actuator array is arranged and adapted to cover N/T track sites in the "principal" operating mode.

4. The combination as recited in claim 3, wherein each transducer/actuator array is also arranged and adapted to cover both a "principal set" of track sites and one, or two, "alternate" sets of adjacent track sites, each such "alternate set" being disposed adjacent the principal set of the respective array, and wherein each array being provided with "primary" drive means adapted to service said track sites in the principal operating mode plus "secondary" drive means arranged to service said "alternate sets" in an "alternate mode" of operation.

5. The combination as recited in claim 4, wherein the track coverage among the several transducer-actuator arrays is arranged to so "overlap" as to provide at lease one alternate, back-up transducer/actuator array for each track.

6. The combination as recited in claim 1, wherein each transducer/actuator array comprises a flat-coil armature means plus associated drive-magnet means.

7. The combination as recited in claim 6, wherein the armature means is mounted and adapted to reciprocate along a prescribed linear actuate path and permanent magnet means is arrayed along this path and adapted to induce translation of the armature means therealong in accordance with appropriate energizing current through the armature means.

8. The combination as recited in claim 7, wherein the armature means includes coil means disposed on substrate means; and where the magnet means comprises at least one pair of opposed permanent magnet pole pieces, each pole piece disposed on a respective side of the path in electro-magnetic driving relation with the armature means.

9. The combination as recited in claim 8, wherein the magnet means comprises at least one set of dual permanent magnet pole pairs, one opposing pole pair having a first magnetic polarity, the other pair having the opposite polarity.

10. The combination as recited in claim 8, wherein each magnet means comprises at least one set of dual opposed permanent magnet pole pairs, each pole disposed on a respective side of the actuate-path in the electro-magnetic driving relation with the armature means, with one opposing pole pair having a first magnetic polarity, the other pair having the opposite polarity; wherein the armature means comprises a planar frame and at least one pair of coils disposed in offset relation on opposite faces of this frame whereby each coil in a pair interacts in sequence, with alternate different pole pairs in a set; and wherein transducer means is mounted adjacent the distal end of each armature means so as to be controllably reciprocated thereby.

11. The combination as recited in claim 10, wherein actuator means are stacked in each array and wherein low-reluctance ferrous shunt means is provided above the topmost actuator and below the bottommost actuator.

12. The combination as recited in claim 11, wherein said substrate means comprise printed circuit boards; wherein said coil means comprise printed circuit coils disposed on said substrate means; and wherein transducer means is mounted adjacent the distal end of each armature means so as to be controllably reciprocated thereby independent of the reciprocation of the other transducer means.

13. The combination as recited in claim 12, wherein each said board is provided with roller means along each elongate side thereof, each roller means adapted to engage respective rail means disposed along said path.

14. The combination as recited in claim 13, wherein the magnet means additionally comprises a first linear array of high performance pole pairs arranged along a primary segment of said path and a second linear array of inexpensive moderate-performance pole pairs arranged along a secondary segment of the path, adjacent the primary segment.

* * * * *

UNITED STATES PATENT AND TRADEMARK OFFICE
CERTIFICATE OF CORRECTION

PATENT NO. : 4,331,990
DATED : May 25, 1982
INVENTOR(S) : Jorgen Frandsen

It is certified that error appears in the above—identified patent and that said Letters Patent is hereby corrected as shown below:

Col. 1, line 50, change "to" (2nd. occurrence) to --so--.
Col. 3, line 37, change "a" to --an--.
Col. 8, line 10, change "metal," to --steel,--.
Col. 10, line 27, change "might" to --to--.
Col. 10, line 29, change "would" to --could--.

Signed and Sealed this

Twenty-fourth Day of August 1982

[SEAL]

Attest:

GERALD J. MOSSINGHOFF

Attesting Officer

Commissioner of Patents and Trademarks